Jan. 26, 1971  A. CARMI ET AL  3,558,298
THERMOPLASTIC MATERIAL PRESSING APPARATUS
Filed Jan. 8, 1968  3 Sheets-Sheet 1

INVENTORS.
ARIEH CARMI
GEORGE D. PARSONS
THOMAS J. RAYESKI
BY Charles W. Gregg
AGENT INVENTORS.
ARIEH CARMI
GEORGE D. PARSONS
THOMAS J. RAYESKI
BY Charles W. Gregg
AGENT United States Patent Office 3,558,298
Patented Jan. 26, 1971

3,558,298
THERMOPLASTIC MATERIAL PRESSING
APPARATUS
Arieh Carmi, George D. Parsons, and Thomas J. Rayeski, Corning, N.Y., assignors to Corning Glass Works, Corning, N.Y., a corporation of New York
Filed Jan. 8, 1968, Ser. No. 696,289
Int. Cl. C03b 11/06
U.S. Cl. 65—356                               29 Claims

ABSTRACT OF THE DISCLOSURE

Apparatus for use in press-forming thermoplastic material and comprising a mold or mold assembly including a relatively thin-walled first mold member or insert having a surface not contacted by said material and a second or back-up member having a relatively massive portion including a surface precisely conforming to said surface of the first member, such members being supported for actuation thereof between a first or partially nested relationship, one within the other, with said surfaces facing and spaced apart from each other, and a second or fully nested relationship in which said surfaces are in intimate contact for heat transfer and deformation resistance purposes. Said back up member embodies a plurality of passages extending through said portion thereof for at times supplying thermal conditioning fluid to the space existing between said surfaces when said members are in other than their fully nested relationship.

BACKGROUND OF THE INVENTION

The present invention relates to the field of art of pressing or press-forming thermoplastic materials and, more particularly, to apparatus comprising a novel type of mold or mold assembly for pressing such materials. Still more specifically, the invention relates to a pressing mold or mold assembly including a thin-walled main or first mold member preferably of a corrosion and abrasion resistant alloy and a second back-up member for said first member, said members being at times supported in a spaced-apart relationship for supplying thermal conditioning fluid between cooperative and conforming surfaces of said members.

Because of the corrosive characteristics of some thermoplastic materials it has heretofore often been found expedient, for purposes of durability of molds used in pressing or press-forming such materials, to make such molds of special alloys. Such special alloys are also used to provide adequate strength at elevated temperatures. Said alloys are relatively expensive and, therefore, for obvious economic reasons, it is desirable that the quantity of the alloy employed be reduced to the maximum extent possible. However, reductions in the wall thickness of molds, mold inserts or mold members used in pressing operations of the type mentioned are limited by the structural strength necessary in such members when they are subjected to thermal and mechanical stresses during such operations. Furthermore, the mass required in such mold members for purposes of themal damping during the early stages of each pressing operation or cycle has heretofore limited the extent to which the wall thickness of said members could be reduced. Accordingly, the apparatus arrangement or mold assembly of the present invention was developed so that substantially thinner-walled molds, or mold members or inserts, than heretofore employed, could be used in pressing operations of the type mentioned, thereby resulting in reductions in the quantities of the relatively expensive alloys used over the quantities of such alloys heretofore required to be employed in said molds or mold members.

SUMMARY OF THE INVENTION

In practicing the invention, a relatively thin-walled mold or mold member preferably of a corrosion and abrasion resistant and relatively high strength alloy, and a cooperative back-up member having a relatively massive portion with a surface conforming to the shape of the surface of said mold or mold member which is not contacted by the thermoplastic material to be press-formed, are employed. Between pressing cycles performed by the use of said members, such members are usually biased apart and maintained in a partially nested relationship with said surfaces facing each other. During a pressing cycle using said members, such members are completely nested with said surfaces in intimate contact for heat transfer purposes and for the purpose of providing resistance to deformation of the thin-walled member. Following such cycle, the members are actuated to their spaced-apart partially nested relationship so that thermal conditioning fluid may be supplied between said surfaces of the members through one or more passages extending through said portion of said back-up member.

DESCRIPTION OF THE PREFERRED
EMBODIMENTS

Figure 1:
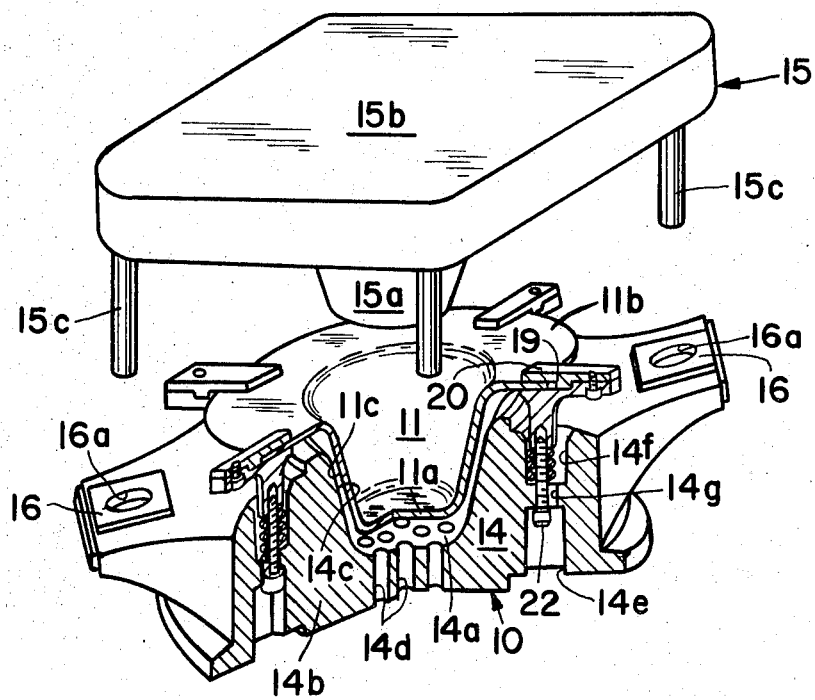
FIG. 1 comprises a perspective view, partially in cross section, of a first or female type of mold or mold assembly embodying the invention.

Referring to FIG. 1 of the drawings in detail, there is shown a female mold or mold assembly 10 comprising a first relatively thin-walled main mold or mold member 11 including a main body or forming portion 11a and an annular flange portion 11b. Mold or mold member 11 may, for example, have a wall of a thickness of approximately $\frac{1}{32}$ inch to $\frac{1}{4}$ inch and such member is, preferably, made of a high strength, and corrosion and abrasion resistant alloy as previously mentioned.

Mold or mold member 11 is normally supported in a partially nested relationship within the hollow or cavity 14a of a second or back-up member 14 including a relatively massive portion 14b having an internal surface 14c precisely conforming in configuration to the external surface 11c of mold or mold member 11 and facing such surface 11c. The means for supporting mold or mold member 11 in said partially nested relationship with said surfaces facing each other will be discussed in detail hereinafter in conjunction with FIG. 3 of the drawings. A plurality of passages such as 14d extend through portion 14b of back-up member 14 as illustrated in FIG. 1 of the drawings. Such passages are used for at times conveying or supplying thermal conditioning fluid, such as heating or cooling fluid, to the space between surface 11c of mold or mold member 11 and surface 14c of member 14 when such surfaces are spaced apart as shown in FIG. 1 of the drawings. This will be discussed further hereinafter in the description.

Mold assembly 10 is intended to be employed in conjunction with a cooperative overlying mold or plunger assembly such as 15 comprising a mold member or plunger such as 15a integrant with or supported in any convenient manner on the bottom of a cross-head, or support member or support portion 15b of assembly 15. A plurality of downwardly dependent alignment pins such as 15c are rigidly mounted on the bottom of support member or portion 15b of plunger assembly 15 and cooperate with holes 16a provided in bushings such as 16 slidably mounted in suitable slots provided in back-up member 14. Such pins and bushings form an alignment system for accurately aligning a plunger assembly such as 15 with the mold assembly 10 during thermoplastic material pressing operations. However, the alignment system per se forms no part of the present invention and, if additional information pertaining to such alignment system is desired, reference may be made to copending U.S. patent application, Ser. No. 445,455 now Pat. No. 3,390,974, filed Apr. 5, 1965 in the names of George D. Parsons and Thomas J. Rayeski, such application being assigned to the same assignee as the present application. Furthermore, it is pointed out that, although the mold assembly 10 shown in FIG. 1 is illustrated as being used in conjunction with a plunger assembly such as 15, such illustration is merely for the purpose of a complete description, and the mold assembly can be used with other types of plunger assemblies and it is not intended that the mold assembly be confined to usage with plunger assemblies such as that illustrated in FIG. 1. Thus, the plunger assembly 15 shown in FIG. 1 comprises, per se, no part of the present invention.

Figure 3:
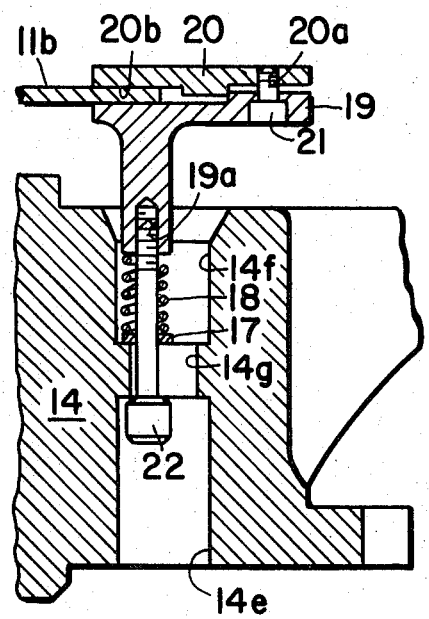
FIG. 3 is a fragmentary sectional view, on an enlarged scale, of a part of the mold assembly of FIG. 1 and illustrating in greater detail one type of mold supports used in said assembly.

Referring now to FIG. 3 of the drawings in conjunction with FIG. 1, a plurality of holes such as 14e extend upwardly and partially through back-up member 14 while a plurality of complemental holes such as 14f extend downwardly and also partially through such member, each such pair of complemental holes being substantially in vertically alignment with each other. Each associated pair of holes 14e and 14f are connected with each other by a longitudinal slot 14g having a length somewhat smaller than the diameter of said holes and a width slightly larger than the shank of a headed bolt 22 extending therethrough. The shank of each bolt such as 22 extends through each associated slot 14g and upwardly through the respectively associated hole 14f. A washer such as 17 having an outer diameter greater than the width of the slots such as 14g is provided on each bolt such as 22 and a compressible coil spring such as 18 surrounds the shank of each such bolt. The upper end of each bolt 22 is screwed into cooperative threads provided in a hole 19a in a downwardly dependent extension of a respectively associated first clamping member 19, and each respective spring 18 is normally slightly compressed between its respectively associated washer 17 and the lower annular surface of said extension of the respective first clamping member 19. Such clamping member and its associated bolt 22 are thus biased to an upward position with the head of the bolt bearing against the portion of the surface within hole 14e which surrounds slot 14g.

A second clamping member 20 is associated with each first clamping member such as 19, and such members fit complementally with each other and are held together by a bolt 21 whose shank extends through member 19 and the threaded end of which is screwed into cooperative threads provided in a hole 20a in the respective second clamping member 20. Each member 20 is mortised to provide a recess 20b of such dimensions that the flange 11b of mold member 11 can snugly fit therein and be securely clamped between each respective pair of associated clamping members 19 and 20 by tightening each respectively associated bolt 21. It is apparent, therefore, that mold or mold member 11 is normally supported in its position shown in FIG. 1 by the plurality of support means such as those just described and which are provided about the annular upper surface of member 14 adjacent cavity 14a therein. Furthermore, the support means provide for the alignment and centering of mold or mold member 11 within cavity 14a of member 14 by permitting lateral movement of each washer 17 and its associated spring 18 within their respectively associated hole 14f, and similar movement of the shank of each bolt such as 22 within its respective associated slot 14g.

In employing the apparatus or mold assembly of FIG. 1 in a molten thermoplastic material pressing operation and in conjunction with a cooperative pressing plunger such as 15, a mold charge of said material is supplied to the forming cavity in mold or mold member 11, and the mold and pressing plunger assemblies are moved toward each other to cause mold member or plunger 15a to enter said forming cavity. As plunger 15a moves further into said cavity it contacts said charge of molten material ond causes it to spread and flow across the bottom of the mold cavity and up between the outer material-contacting surface of plunger 15a and the inner surface of mold 11. As the pressing pressure increases during the press-forming operation, the biasing force which normally maintains mold or mold member 11 in its normal position shown in FIG. 1 and which is supplied to such mold or mold member by the springs such as 18. is increasingly overcome and mold or mold member 11 moves into cavity 14a in back-up member 14 until the molten material non-contacting surface 11c of said mold or mold member is moved into intimate contact with its complemental facing surface 14c of portion 14b of member 14. At such time the portion of surface 11c of mold or mold member 11, adjacent the center of the bottom of such mold, seals off the passages such as 14d in back-up member 14. Heat from the charge of molten material in the forming cavity of mold or mold member 11 is transferred relatively rapidly, due to the thinness of the wall of member 11, through such wall and to the relatively massive portion 14b of back-up member 14. Member 14 at such time provides the mass required for thermal damping necessitated by the high heat flux rates occurring during such stage of the press-forming cycle and, simultaneously, provides back-up strength for mold or mold member 11 for resistance to deformation thereof due to thermal and mechanical stresses to which such member is subjected during such stage of press-forming.

Subsequent to the press-forming operation discussed above, mold assemblies 10 and 15 are moved away from each other and, as the pressing pressure is thereby reduced and pressing plunger withdrawn from the forming cavity in mold 11, springs 18 return mold or mold member 11 to its normally biased partially nested position illustrated in FIG. 1. During the initial part of the return of mold or mold member 11 to said biased position, such member uncovers passages such as 14d in the bottom of portion 14b of back-up member 14 and cooling fluid such as compressed air may then be supplied through said passages to the space between surface 11c of mold or mold member 11 and surface 14c of portion 14b of back-up member 14. Heat remaining in said members from the pressing of the charge of molten thermoplastic material therein is then transferred from both members through both said surfaces 11c and 14c to said cooling fluid to provide an increased rate of dissipation of said heat. Surfaces 11c and 14c are, at such time, at a higher temperature than they would be if mold or mold member 11 had a thick mold wall since a thick wall member would provide a greater mass for storage or retention of the heat supplied thereto from the charge of molten thermoplastic material. It is also pointed out that the duplication of surfaces such as 11c and 14c for said dissipation of heat usually obviates necessity for cooling fins such as usually employed because the extra cooling area of the second surface provided by the apparatus arrangement shown provides a substitute for the cooling areas of said cooling fins usually employed.

Figure 2:
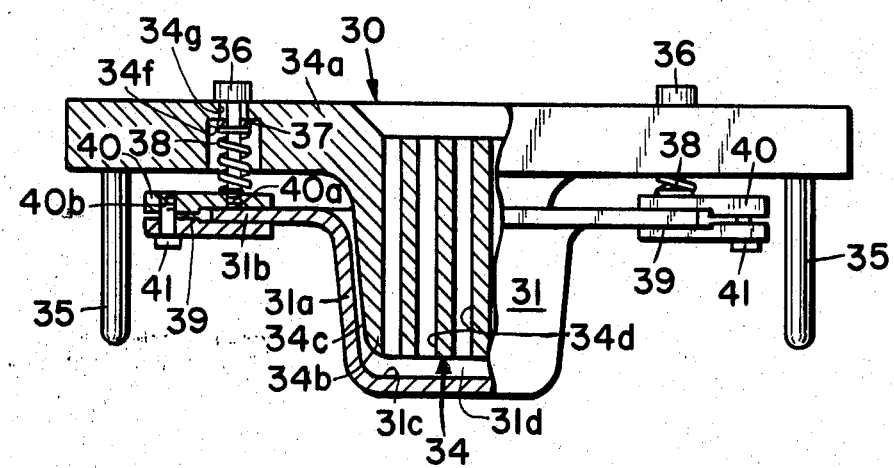
FIG. 2 comprises a partial sectional vertical elevation through a second type or male mold embodying the invention.

There is shown in FIG. 2 of the drawings a male mold or mold assembly 30 comprising a first relatively thin-walled main mold or mold member 31 including a main body or forming portion 31a and an annular flange portion 31b. Mold or mold member 31 may, for example, have a wall thickness of approximately 1/32 inch to 1/4 inch and such member is, preferably, made of one of said high strength, and corrosion and abrasion resistant alloys as previously discussed.

Mold or mold member 31 is normally supported in and biased to a partially nested relationship with a back-up member 34 having a relatively massive dependent portion 34b. That is to say, portion 34b of member 34 normally partially nests within hollow or cavity 31d of mold or mold member 31 with the external surface 34c of said portion facing the internal surface 31c of body or main portion 31a of mold member 31. External surface 34c of portion 34b of back-up member 34 has a configuration precisely conforming to said internal surface 31c of mold member 31 and, therefore, said members may be actuated to a fully nested relationship in which said surfaces are in intimate contact with each other. The means for supporting mold or mold member 31 in said partially nested relationship will be discussed hereinafter.

A plurality of passages such as 34d extends vertically through portion 34b of back-up member 34 and open into cavity 31d of member 31 as illustrated in FIG. 2. Such passages are used for at times supplying thermal conditioning fluid, such as a heating or cooling fluid, to the space existing between surface 31c of member 31 and surface 34c of portion 34b of member 34 when such surfaces are spaced apart or not in intimate contact with one another. This will be further discussed hereinafter in the description.

Back-up member 34 further includes a cross-head or support portion 34a from which said portion 34b of the member 34 depends. A plurality of alignment pins 35 are rigidly attached to the bottom of portion 34a and depend therefrom. Such pins correspond to pins 15c of plunger assembly 15 of FIG. 1 of the drawings and are used for the same purpose, that is, for precise alignment of the mold or plunger assembly 30 with a cooperative female mold assembly which is not shown in the drawings for purposes of simplification thereof but which may, for example, comprise a mold assembly such as shown in FIG. 1 or any other suitable type of cooperative mold assembly.

Mold or mold member 31 shown in FIG. 2 is supported in a manner similar to that described for the support of mold or mold member 11 of FIG. 1. That is, a plurality of compressible coil springs and associated clamping assemblies are disposed about portion 34a of mold member 34 so as to support mold or mold member 31 by the flange portion 31b thereof. Each such supporting arrangement comprises a headed bolt 36 whose shank extends down through a slot such as 34g provided in portion 34a of member 34 and thence through a hole such as 34f in such portion. Slot 34g has a width slightly greater than the shank of bolt 36 and a washer 37 surrounds said shank below slot 34g. A compressible coil spring 38 surrounds the shank of bolt 36 below washer 37 and the lower end of the such shank is screwed into cooperative threads provided in a hole 40a in a first member 40 of a clamping assembly. A second headed bolt 41 extends upwardly through a second member 39 of said clamping assembly and is screwed into cooperating threads provided in a hole 40b provided in member 40 of the clamping assembly. Both members 39 and 40 are mortised to provide a recess in which the flange portion 31b of mold or mold member 31 snugly fits, and bolt 41 is tightened to securely clamp said flange portion between members 39 and 40. Spring 38 is of a length such that it is somewhat compressed between the bottom surface of washer 37 and the top surface of clamping member 40 when bolt 36 is tightened. Thus, mold or mold member 31 is supported as illustrated and is normally biased to a position such that portion 34b of member 34 is normally partially nested within cavity 31d of mold or mold member 31 with surface 34c facing the molten material non-contacting surface 31c of mold or mold member 31. Furthermore, similar to the support means shown in FIG. 3, alignment and centering of mold or mold member 31 with the center of the bottom of portion 34b of member 34 is provided for by permitting the shank of bolt 36 to move laterally within slot 34g in portion 34a of member 34, and spring 38 and washer 37 to correspondingly move within hole 34f in portion 34a.

During a press-forming operation using mold assembly 30 of FIG. 2, such assembly is actuated in a manner similar to that described in conjunction with the assembly of FIG. 1. It is believed that such will be obvious to those skilled in the art in view of the previous detailed description of the manner of actuation of the assembly of FIG. 1 during a press-forming operation. It is pointed out, however, that the parts of the inside surface 31c of portion 31a of mold or mold member 31 facing the lower ends of passages such as 34d extending vertically through portion 34b of member 34, closes or seals off the lower ends of such passages when surfaces 31c and 34c are actuated into intimate contact with one another during the full nesting of portion 34b within cavity 31d in the course of a press-forming cycle. Thermal conditioning fluid can, therefore, be supplied between surfaces 31c and 34c only when said members are not fully nested. Since the mold assembly 30 of FIG. 2 is actuated in a manner similar to and for purposes identical to those described in conjunction with the mold assembly 10 of FIG. 1 no further detailed discussion of the manner of actuation of assembly 30 during a pressing cycle is considered necessary.

Figure 4:
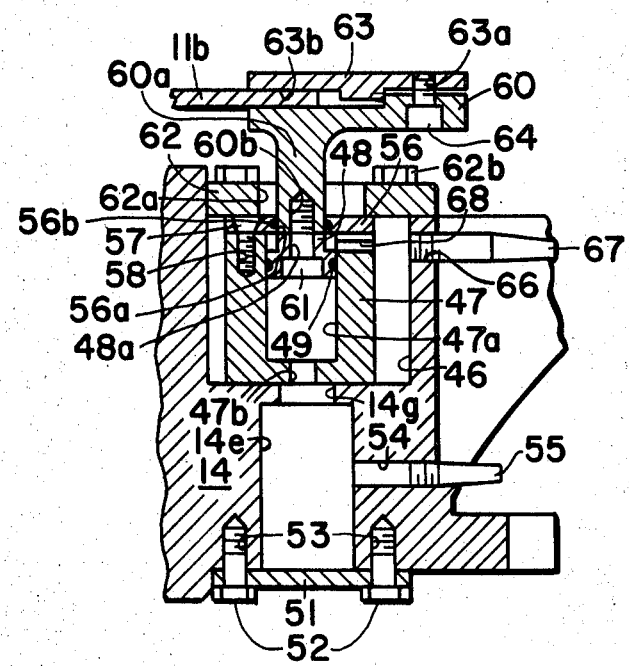
FIG. 4 is a view similar to FIG. 3 and illustrating an alternative form of said mold supports.

Referring to FIG. 4 of the drawings, an alternative support arrangement for a mold or mold member such as 11 of mold assembly 10 of FIG. 1 will be briefly discussed.

There is shown in FIG. 4 pressurized fluid actuated means for supporting a mold or mold member such as 11 in the position shown in FIG. 1 of the drawings. Such means may be used in place of the coil spring support means shown in FIG. 3. In the mold or mold member support means of FIG. 4, a plurality of holes such as 14e and slots such as 14g, which are identical to holes 14e and 14g, respectively, shown in FIGS. 1 and 3 of the drawings, are provided in member 14. Each slot such as 14g connects the respectively associated hole 14e with one of a plurality of holes such as 46 provided about the top of member 14 adjacent cavity 14a therein and extending downwardly through such member to connect with the respective slot 14g. Since the support means associated with each respective pair of holes and slots such as 14e and 14g in FIG. 4 are identical, the description below will proceed as if only one such support arrangement is provided.

Hole 46 in member 14 is of a relatively large diameter and provides a housing for a pressurized fluid cylinder 47 of a smaller outer diameter than hole 46. Pressurized fluid cylinder 47 embodies the usual piston chamber 47a which contains a piston 48 about the outer periphery of which is disposed, in the usual manner, a piston ring such as an O-ring 49. Piston 48 is reciprocatively vertically movable within cylinder 47 with O-ring 49 providing a seal between the outer periphery of the piston and the periphery of the inner surface of cylinder 47.

The bottom of hole 14e is hermetically sealed from atmosphere by a suitable plate 51 secured to the bottom surface of member 14 by bolts such as 52 extending through such plate and screwed into cooperating threads provided in holes such as 53 extending into said member 14. A first fluid conduit or passage 54 is provided in member 14 and one end of such passage opens into hole 14e in such member. The other end of passage 54 is threaded and is provided with a nipple 55 to which a suitable flexible fluid conduit (not shown) can be connected for purposes hereinafter discussed. The bottom of cylinder 47 embodies a hole 47b by which pressurized fluid or vacuum can be supplied through passage 54 to piston chamber 47a to pass or draw, respectively, against the bottom of piston 48.

The top of cylinder 47 is partially closed by a suitable plate 56 which is secured to the upper annular rim of cylinder 47 by screws such as 57 screwed into cooperating threads provided in holes such as 58 provided in cylinder 47. Piston 48 is secured to a first clamping member 60 having a downwardly dependent portion 60a which in effect provides a piston rod for piston 48. Plate 56 embodies a hole 56a through which piston rod 60a snugly but slidably extends. A gasket such as an O-ring 56b is provided in a suitable annular groove provided in the wall of plate 56 defining the limits of hole 56a. Such O-ring provides for hermetic sealing between the outer periphery of piston rod 60a and said wall of plate 56 and, thereby hermetic sealing of the upper end of piston chamber 47a. A second fluid conduit or passage 66 is provided in and extends through member 14, and opens into hole 46 in such member. Passage 66 is threaded and a cooperatively threaded nipple 67 is screwed into the threads provided in such passage. A suitable flexible fluid conduit (not shown) can be connected to the free end of nipple 67 for purposes hereinafter discussed. At least one fluid passage such as 68 extends through the wall of cylinder 47 and into piston chamber 47a adjacent the upper end thereof. Hole 46 in member 14 thereby connects with piston chamber 47a above the upper annularly recessed portion of piston 48.

The means for securing piston 48 to piston rod 60a comprises a bolt or screw 61 having a shank portion which extends through a suitable hole 48a extending vertically through piston 48 and which is screwed into cooperative threads provided in a hole 60b in piston rod 60a. A plate 62, embodying a slot 62a through which piston rod 60a extends, is secured to the top surface of member 14 by a plurality of bolts such as 62b screwed into suitable holes (not shown) in member 14. The bottom surface of plate 62 bears downwardly against the top surface of plate 56 to, in turn, press the bottom surface of cylinder 47 downwardly against the bottom surface of hole 46. The pressure so applied between said surfaces is only enough to provide the most hermetic seal possible between such surfaces commensurate with relatively free sliding movement therebetween. It is pointed out that the width of slot 62a in plate 62 is only slightly greater than the diameter of piston rod 60a, for purposes hereinafter discussed.

A second clamping member 63 is secured to previously-mentioned clamping member 60 by a screw or bolt 64 whose shank extends through member 60 and is screwed into cooperating threads provided in a hole 63a in member 63. The flange portion 11b of mold or mold member 11 is disposed in a recess 63b provided between clamping members 60 and 63 by the mortising of member 63. The similarity of the mold or mold member clamping arrangements of FIGS. 3 and 4 is readily apparent.

In use, the mold or mold member support means of FIG. 4 may be actuated, for example, by supplying fluid from a suitable constant pressure pressurized fluid source through a suitable flexible conduit, as previously mentioned, to nipple 55. Such fluid flows into manifold 14e, through slot 14g and into piston chamber 47a to force piston 48 upwardly to the position shown in FIG. 4. Each such support means used in supporting mold or mold member 11 is similarly actuated and, therefore, such member may thus be floatingly supported in a position similar to that illustrated in FIG. 1. The floating characteristics of such support means at such time results from additional compressibility of the presurized fluid and/or the forcing of a part of such fluid to return toward its source. Thus, when the support means of FIG. 4 are employed and mold or mold member 11 is used in a press-forming operation as previously discussed, after the pressure supplied to such member and to the charge of thermoplastic material therein by the pressing plunger such as 15a (FIG. 1) exceeds a selected amount, the pistons such as 48 of the support means are forced downwardly in their respective chambers such as 47a until the bottom surface 11c of mold or mold member 11 is pressed into intimate contact with surface 14c of portion 14b of member 14. As the plunger such as 15a is withdrawn following the pressing operation, the pressurized fluid returns the pistons such as 48 to their positions shown in FIG. 4 and thermal conditioning fluid may then be admitted through passages such as 14d in member 14 to flow through the space then existing between surface 11c of mold or mold member 11 and surface 14c of portion 14b of member 14 as previously discussed in conjunction with the support means of FIG. 3. During such operation of the apparatus of FIG. 4, nipple 67 is connected to a suitable fluid sink or to atmosphere and air may thereby be drawn into or expelled from about the upper end of piston 48 during actuation of such piston between its upper and lower positions within piston chamber 47a.

It is pointed out that pressurized fluid cylinder 47 and piston rod 60a are permitted to move laterally within hole 46 in member 14 and slot 62a in plate 62, respectively, for alignment and centering of the mold or mold member such as 11 within cavity 14a of member 14. Also, support means such as those of FIG. 4 provide for ready adjustment of the pressing pressure required for actuating mold or mold member 11 to its lowermost position within cavity 14a of member 14. This is accomplished by adjusting the value of the pressure of the pressurized fluid supplied to such support means.

It is believed expedient to point out at this time that the support means of FIG. 4 can be actuated, for the purpose intended, in ways other than connecting a source of constant pressurized fluid to nipple 55 as previously discussed. For example, positive pressure or negative pressure (vacuum) may be selectively supplied to nipple 55 and, thereby, to passage 54 and to the bottom of piston 48 for upward and downward actuation, respectively, of the support means of FIG. 4 at preselected times. Alternatively, positive pressure or negative pressure (vacuum) may be selectively supplied to nipple 67 and, thereby, to passage 66 and to the top of piston 48 for downward and upward actuation, respectively, of said support means at preselected times. Nipple 55 would then be connected to atmosphere or a suitable fluid sink. Furthermore, suitable valve means of types well known in the art could be provided and pressurized fluid could be supplied alternately to each of the nipples 55 and 67 through such valve means with the other of such nipples being alternately connected through such valve means to a pressurized fluid sink or to atmosphere. As will be readily apparent to those skilled in the art, further alternatives for the actuation of the support means of FIG. 4 comprise selectively and alternately supplying positive pressure and/or negative pressure (vacuum) to either or both nipples 55 and 67 for actuation of the support means at preselected times.

Figure 5:
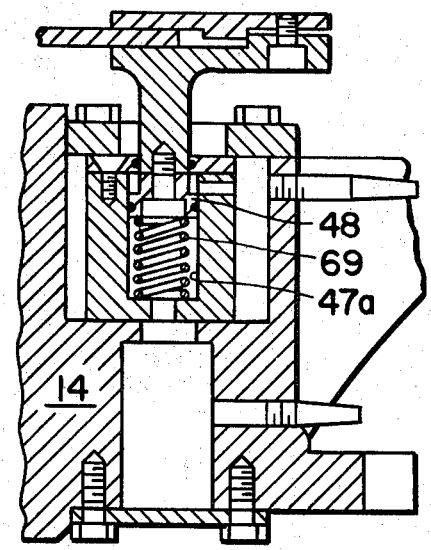
FIGS. 5 and 6 are views similar to FIGS. 3 and 4 illustrating further alternative forms of the mold supports.
Similar reference characters refer to similar parts in each of the figures of the drawings.

There is shown in FIG. 5 of the drawings a modification of the support means of FIG. 4. The parts of such support means are identical to those of FIG. 4 and, therefore, most of the reference characters are omitted from FIG. 5 for purposes of simplification of such drawing. The modification of FIG. 5 comprises the provision of a compressible coil spring 69 in piston chamber 47a and below piston 48 to exert force upwardly against the bottom of such piston. Such coil spring, thereby functions the same as coil spring 18 of FIG. 3. Alternatively, if found desirable or expedient to do so, a coil spring such as 69 could be supplied in piston chamber 47a above piston 48 to exert force downwardly against such piston. In either modification, positive and negative fluid pressures are or may be used in conjunction with the respective coil spring employed, and in the manner discussed in relation to the support means of FIG. 4, to selectively actuate the support means at preselected times and at desired rates of speed of actuation.

Figure 6:
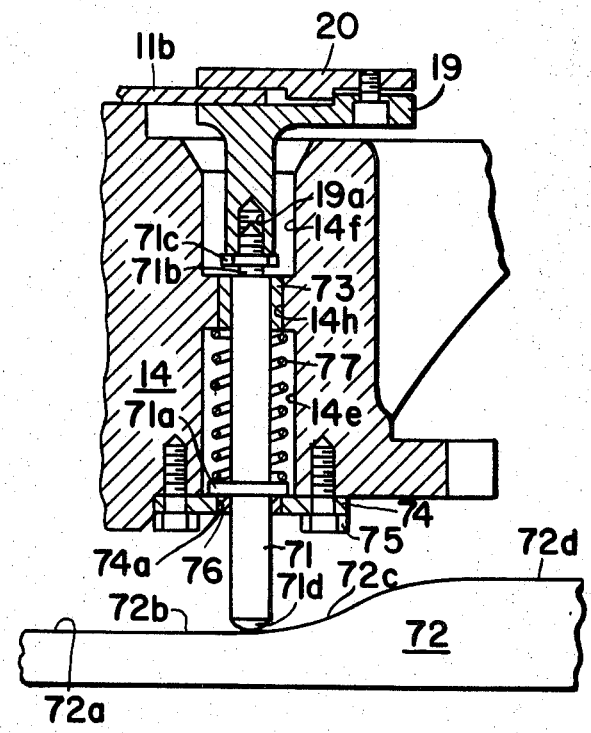

The mold support means of FIG. 6 is somewhat similar to that of FIG. 3 and further includes a cam follower 71 which is intended to be actuated by a suitable cam such as 72 as discussed hereinafter. In the mold support means of FIG. 6, flange 11b of mold member 11 is clamped by clamping members 19 and 20 in the manner discussed in conjunction with FIG. 3 and no further discussion of such clamping arrangement is believed necessary. Furthermore, holes 14e and 14f in member 14 in FIG. 6 are shown as being identical to those shown in FIG. 3. However, in FIG. 6 a circular hole 14h extends between holes 14e and 14f and is press fitted with a suitable bushing 73 through which the previously-mentioned cam follower 71 snugly but slidably extends. A guide plate 74 is secured by bolts such as 75 to the bottom of member 14 below hole 14e. A suitable bushing 76 is press fitted into a hole 74a extending through guide plate 74 and cam follower 71 also snugly but slidably extends through such bushing.

An annular and outwardly extending flange 71a is firmly secured in any convenient manner about the outer periphery of cam follower 71. The upper end of cam follower 71 includes a portion 71b of a smaller diameter than the remainder of the cam follower, such portion being provided with threads which are cooperative with the threads provided in hole 19a of the previously-mentioned downwardly dependent extension of clamping member 19. A locknut 71c is provided on said threaded portion 71b of cam follower 71. Such threaded portion is screwed into hole 19a in said dependent extension of clamping member 19 and locknut 71c is then tightened against the bottom surface of said extension. A compressible coil spring 77 is disposed in hole 14e and about that part of cam follower 71 extending through hole 14e in member 14. The upper and lower ends of spring 77 bear against the surface of the wall defining the upper limits of hole 14e and said flange 71a on cam follower 71, respectively.

As previously mentioned, each cam follower 71 employed is intended to be actuated by a suitable and respectively associated cam such as 72 illustrated in FIG. 6. As shown, the lower end 71d of cam follower 71 bears against the upper edge 72a of cam 72, such upper edge providing a cam track for actuation of cam follower 71. When, in relationship to cam track 72a, cam follower 71 is in the position shown in FIG. 6, spring 77 is extended and actuates lower end 71d of cam follower 71 downwardly against the lower portion 72b of cam track 72a. This causes actuation of the mold member 11, with which a plurality of support means such as shown in FIG. 6 are employed, downwardly into cavity 14a in the respectively associated back-up member 14 until surfaces 11c and 14c of the respective members are in intimate contact with one another. When each cam follower such as 71 or cams such as 72, or both, move relative to one another so that lower end 71d of each cam follower such as 71 rides upwardly along the slope 72c of the respectively associated cam track 72a to the higher portion 72d of each such cam track, the cam followers such as 71 are actuated upwardly against the force of the springs such as 77. At such time, the cam followers actuate mold member 11 upwardly to a position such as illustrated in FIG. 1. The springs such as 77 will, of course, again actuate the cam followers and, thereby, mold member 11 downwardly as the lower end 71d of each cam follower rides downwardly along a slope such as 72c on cam track 72a of the respectively associated cam 72. Such operation of cams and cam followers is well known to those skilled in the art. The cams such as 72, per se, form no part of the present invention but such a cam is shown in the drawings and discussed above merely to make the description of the supporting means of FIG. 6 complete.

It is pointed out that support means such as those illustrated in FIGS. 4, 5 and 6 are readily adaptable, by minor modifications thereof, for supporting a male mold or mold member such as member 31 shown in FIG. 2 of the drawings. This will also be readily apparent to those skilled in the art.

The use of the support means of FIGS. 4, 5 or 6 rather than those of FIG. 3 is expedient when the thermoplastic material to be press-formed has a relatively high viscosity or when the respective thin-walled mold member employed is provided with an exceptionally thin wall and is, therefore, more subject to possible deformation. Under such conditions the support means of FIGS. 4, 5 or 6 can be selectively actuated to move the mold member and the back-up member to their fully nested position either prior to the supplying of a charge of thermoplastic material to the mold member during each press-forming cycle, or immediately following such supplying of a charge and prior to the press-forming operation itself. The back-up member thereby prevents deformation of the thin-walled mold member as a result of high pressing pressure supplied thereto especially during the initial part of said press-forming operation itself. Furthermore, the use of the support means of FIGS. 4, 5 or 6 permits a mold member to be maintained in, or moved into or out of, its fully nested relationship with its respective back-up member at selected points in time or for selected periods in time between press-forming operations. The advantages of the flexibility in the press-forming cycles thereby provided, and possible variations also thereby provided in the cycles of supplying thermal conditioning fluid between said members, will be readily apparent to those skilled in the art. It is further pointed out that support means such as shown in FIG. 6 may be advantageously employed when pairs of associated mold and backup members of the type disclosed herein are used on a machine to which it is inconvenient or relatively difficult to connect pressurized fluid conduits for the purpose of reciprocatively actuating said members between their partially and fully nested positions.

Briefly summarizing the salient points and the essence of the invention disclosed herein, the invention comprises a first relatively thin-walled or mold member including a thermoplastic material press-forming surface and an opposite surface, and a second relatively massive back-up member including a portion having a surface conforming in configuration to said opposite surface of said first mold member. Said members are supported relative to one another so that such members may be reciprocatively actuated between a first partially nested relationship with said conforming surfaces thereof spaced-apart and facing each other, and a second fully nested relationship in which said surfaces are in intimate contact with each other. Several means are shown and described for so supporting said members. When such members are in other than said second relationship, thermal conditioning fluid can be supplied to the space then existing between said conforming surfaces of the members. Such thermal conditioning fluid can be a cooling fluid, a heating fluid, or both such types of fluids can be supplied to said space in selected sequence or sequences. When the members are used in the press-forming of molten glass, for example, cooling fluid will usually be supplied to said space following each press-forming cycle. When the members are used in the press-forming of polystyrene, for example, heating fluid may be supplied to said space, previous to each press-forming cycle, to initially heat the thin-walled mold member and, following each press-forming cycle, cooling fluid may be supplied to such space.

The invention makes possible the use of relatively thin-walled mold members in the press-forming of articles from thermoplastic materials. This provides an extremely important economic advantages when said materials are corrosive and/or abrasive thereby generally making it necessary to use special, but relatively expensive, corrosion and/or abrasion resistant alloys for the material of the mold members. Furthermore, thin-walled mold members can oftentimes be made by simple press-forming thereof rather than the substantially more expensive machining operations usually required for forming thick walled mold members. The invention also provides the previously-discussed advantages in heat transfer, whether such transfer be from the thin-walled molded member to said back-up member or a cooling fluid, or from back-up member or a heating fluid to said thin-walled member. The relatively low mass of thin-walled mold members provides for low heat retention or heat storage characteristics of such members and, therefore, for rapid transfer of heat between opposite material contacting and non-contacting surfaces of the walls of the members.

Although there is herein shown and described in detail only several embodiments of the invention, it will be understood that various changes and modifications may be made therein within the scope of the appended claims without departing from the spirit and scope of the invention.

What is claimed is:

1. A mold assembly for use in pressing thermoplastic material, such assembly comprising, in combination:
    (A) a thin-walled first mold member and a second member having a massive portion including a surface precisely conforming to the configuration of a thermoplastic material non-contacting surface of said first member;
    (B) resilient means connected to and positioned between said members for permitting actuation of such members between two positions relative to one another, a first of such positions comprising a partially nested relationship with said surfaces thereof spaced apart and facing each other, and the second of such positions comprising a fully nested relationship with said surfaces thereof in intimate contact with each other whereby said second member prevents deformation of said first member, such means normally maintaining said members in one of said positions; and
    (C) said second member embodying at least one passage extending through said portion thereof for at selected times conveying thermal conditioning fluid to the space existing between said surfaces of said members when said members are in other than said second of said positions.

2. Apparatus in accordance with claim 1 and in which said supporting means includes resilient spring members for normally maintaining said members in said one of said positions.

3. Apparatus in accordance with claim 1 and in which said one of said positions is said first position.

4. Apparatus in accordance with claim 1 and in which said one of said positions is said second position.

5. Apparatus in accordance with claim 1 in which said members form a female mold assembly.

6. Apparatus in accordance with claim 1 in which said members form a male mold assembly.

7. An assembly for use in press-forming molten thermoplastic material, such apparatus comprising, in combination:
    (A) a thin-walled mold of a corrosion and abrasion resistant material, the wall of such mold including first and second opposite molten material contacting and non-contacting surfaces, respectively,
    (B) a back-up member for said mold, such member including a massive portion having a surface with a configuration precisely conforming to said second surface of said mold wall;
    (C) resilient means connected to and positioned between said mold and said member for permitting actuation thereof between a first position in which said conforming surfaces thereof face each other with the mold and member spaced apart in a partially nesting relationship, one within the other, and a second position in which such mold and member are completely nesting one within the other with said conforming surfaces thereof in intimate contact whereby said member prevents deformation of said mold, said means biasing said mold and member to a selected one of said positions; and
    (D) a passage extending through said portion of said back-up member for supplying fluid to the space existing between said conforming surfaces when said mold and member are in other than said second position.

8. Apparatus in accordance with claim 7 in which said mold is a female mold.

9. Apparatus in accordance with claim 7 in which said mold is a male mold.

10. A female mold assembly, useful in conjunction with a cooperative male mold assembly, for press-forming charges of molten thermoplastic material, such female assembly comprising, in combination:
    (A) a first thin-walled mold member of a corrosion and abrasion resistant alloy, the wall of such member including a first surface defining the limits of a press-forming cavity and a second surface opposite said first surface;
    (B) a second member including a massive portion embodying a cavity having a surface precisely conforming in configuration to said second surface of said first member so as to impart to said members a nestable relationship such that such surfaces thereof may be disposed in intimate contact with each other whereby said second member prevents deformation of said first member, said portion of said second member also embodying at least one fluid supply passage extending through such portion and opening through said surface thereof; and
    (C) resilient means connected to and positioned between said members for permitting actuation thereof between said nestable relationship and a partially nested relationship with each other with said second surface of said first member facing said surface of said cavity in said second member, such means biasing said members away from one of said relationships to said other relationship.

11. A female mold assembly in accordance with claim 10 and in which said means includes a plurality of compressible spring members.

12. A female mold assembly in accordance with claim 10 and in which said means includes a plurality of pressurized fluid actuated pistons and associated piston housings.

13. A female mold assembly in accordance with claim 11 and in which said means further includes a cam follower associated with each of said member and arranged to be actuated by a respectively associated cooperative cam.

14. A male mold assembly, useful in conjunction with a cooperative female mold assembly, for press-forming charges of molten thermoplastic material, such male assembly comprising, in combination:
    (A) a thin-walled plunger member of a corrosion and abrasion resistant alloy, the wall of such member having a first molten material forming surface and a second surface opposite said first surface and defining the limits of a cavity in such member;

(B) a second member including a massive portion having a surface precisely conforming in configuration to said second surface of said first member so as to impart to said members a nestable relationship such that such surfaces thereof may be disposed in intimate contact with each other whereby said second member prevents deformation of said plunger member, said portion of said second member also embodying at least one fluid supply passage extending through such portion and opening through said surface thereof; and (C) resilient means connected to and positioned between said members for permitting actuation thereof between said nestable relationship and a partially nested relationship with each other with said second surface of said first member facing said surface of said second member, such means biasing said members away from one of said relationships to said other relationship.

15. A male mold assembly in accordance with claim 14 and in which said means includes a plurality of compressible spring members.

16. A male mold assembly in accordance with claim 14 and in which said means includes a plurality of pressurized fluid actuated pistons and associated piston housings.

17. A male mold assembly in accordance with claim 15 and in which said means further includes a cam follower associated with each said spring member and arranged to be actuated by a respectively associated cooperative cam.

18. A mold assembly for use in pressing molten thermoplastic material, such assembly comprising, in combination:

(A) a thin-walled first mold member and a second member having a massive portion including a surface precisely conforming to the configuration of a thermoplastic material non-contacting surface of said first member, such members being nestable one within the other with said surfaces thereof in intimate contact with each other whereby said second member prevents deformation of said first member;

(B) means connected to and positioned between said members for supporting said members with said surfaces thereof facing each other, such means resiliently biasing the members to a partially nested spaced-apart relationship; and (C) said second member embodying at least one passage extending through said relatively massive portion thereof for at times conveying cooling fluid to the space existing between said surfaces when said members are biased to said partially nested relationship by said supporting means.

19. Apparatus in accordance with claim 18 in which said members form a female mold assembly.

20. Apparatus in accordance with claim 18 in which said members form a male mold assembly.

21. An assembly for use in press-forming molten glass, such apparatus comprising, in combination:

(A) a thin-walled mold of a corrosion and abrasion resistant material, the wall of such mold including first and second opposite molten glass contacting and non-contacting surfaces, respectively;

(B) a back-up member for said mold, such member including a massive portion having a surface of a configuration precisely conforming to said second surface of said mold wall;

(C) means connected to and positioned between said mold and said back-up member for supporting said mold and back-up member with said conforming surfaces thereof facing each other and with the mold and member normally resiliently spaced and biased apart in a partially nesting relationship, one within the other whereby said back-up member prevents deformation of said mold, such mold and member being completely nestable one within the other with said conforming surfaces thereof in intimate contact when used in a glass-pressing operation; and (D) a passage extending through said massive portion of said back-up member for supplying cooling fluid to the space normally existing between said conforming surfaces of said mold and back-up member.

22. Apparatus in accordance with claim 21 in which said mold is a female mold.

23. Apparatus in accordance with claim 21 in which said mold is a male mold.

24. A female mold assembly, useful in conjunction with a cooperative male mold assembly, for press-forming charges of molten glass, such female assembly comprising, in combination:

(A) a first thin-walled mold member of a corrosion and abrasion resistant alloy, the wall of such member including a first surface defining the limits of a glass-forming cavity and a second glass non-contacting surface opposite said first surface;

(B) a second member including a massive portion embodying a cavity having a surface precisely conforming in configuration to said second surface of said first member so as to impart to said members a nestable relationship such that said surfaces thereof may be disposed in intimate contact with each other whereby said second member prevents deformation of said first mold member, said portion of said second member also embodying at least one cooling-fluid supply passage extending through such portion and opening through said surface thereof; and (C) means connected to and positioned between said members for resilient supporting said members in a partially nested relationship with each other and with said second surface of said first member facing said surface of said cavity in said second member, such means resiliently biasing said members away from said nestable relationship to said partially nested relationship.

25. A female mold assembly in accordance with claim 24 and in which said resilient supporting and biasing means includes a plurality of compressible spring members.

26. A female mold assembly in accordance with claim 24 and in which said resilient supporting and biasing means includes a plurality of pressurized-fluid actuated pistons and associated piston housings.

27. A male mold assembly, useful in conjunction with a cooperative female mold assembly, for press-forming charges of molten glass, such male assembly comprising, in combination:

(A) a thin-walled plunger member of a corrosion and abrasion resistant alloy, the wall of such member having a first molten glass contacting forming surface and a second glass non-contacting forming surface opposite said first surface and defining the limits of a cavity in such member;

(B) a second member including a massive portion having a surface precisely conforming in configuration to said second surface of said first member so as to impart to said members a nestable relationship such that such surfaces thereof may be disposed in intimate contact with each other whereby said second member prevents deformation of said plunger member, said portion of said second member also embodying at least one cooling-fluid supply passage extending through such portion and opening through said surface thereof; and (C) means connected to and positioned between said members for resiliently supporting said members in a partially nested relationship with each other and with said second surface of said first member facing said surface of said second member, such means resiliently biasing said members away from said nestable relationship to said partially nested relationship.

28. A male mold assembly in accordance with claim 27 and in which said resilient supporting and biasing means includes a plurality of compressible spring members.

29. A male mold assembly in accordance with claim 27 and in which said resilient supporting and biasing means includes a plurality of pressurized-fluid actuated pistons and associated piston housings.

References Cited

UNITED STATES PATENTS

| | | | |
|---|---|---|---|
| 3,251,668 | 3/1966 | Brymer | 65—307X |
| 2,760,231 | 8/1956 | St. Clair | 18—19P |
| 2,882,647 | 4/1959 | Tallent | 65—362 |

S. LEON BASHORE, Primary Examiner

J. B. HARDAWAY, Assistant Examiner

U.S. Cl. X.R.

18—17, 19, 35; 65—305, 319, 359, 361, 362, 374